United States Patent
Lauer et al.

(10) Patent No.: US 6,654,012 B1
(45) Date of Patent: Nov. 25, 2003

(54) EARLY RAY TERMINATION IN A PARALLEL PIPELINED VOLUME RENDERING SYSTEM

(75) Inventors: Hugh C. Lauer, Concord, MA (US); Larry D. Seiler, Boylston, MA (US); Charidimos E. Gasparakis, Acton, MA (US); Vikram Simha, Lexington, MA (US); Kenneth W. Correll, Lancaster, MA (US)

(73) Assignee: TeraRecon, Inc., San Mateo, CA (US)

( * ) Notice: Subject to any disclaimer, the term of this patent is extended or adjusted under 35 U.S.C. 154(b) by 0 days.

(21) Appl. No.: 09/410,771

(22) Filed: Oct. 1, 1999

(51) Int. Cl.[7] .................................................. G06T 15/00
(52) U.S. Cl. ...................................................... 345/424
(58) Field of Search ................................. 345/424, 426, 345/431, 517, 419

(56) References Cited

U.S. PATENT DOCUMENTS

| | | | |
|---|---|---|---|
| 5,594,842 A | * 1/1997 | Kaufman et al. | 345/424 |
| 5,963,212 A | * 10/1999 | Bakalash | 345/424 |
| 6,278,459 B1 | * 8/2001 | Malzbender et al. | 345/424 |
| 6,313,841 B1 | * 11/2001 | Ogata et al. | 345/424 |

* cited by examiner

Primary Examiner—Phu K. Nguyen
(74) Attorney, Agent, or Firm—Blakely, Sokoloff, Taylor & Zafman LLP

(57) ABSTRACT

A method renders a volume data set as an image in a volume rendering system. The volume data set includes a plurality of voxels stored in a memory. The volume rendering system includes a plurality of parallel processing pipelines. The image includes a plurality of pixels stored in the memory. A set of rays are cast through the volume data set. The volume data set is partitioned into a plurality of sections aligned with the sets of rays. Voxels along each ray of each set are sequentially interpolated voxels in only one of the plurality of pipelines to generate samples only as long as the samples contribute to the image.

15 Claims, 9 Drawing Sheets

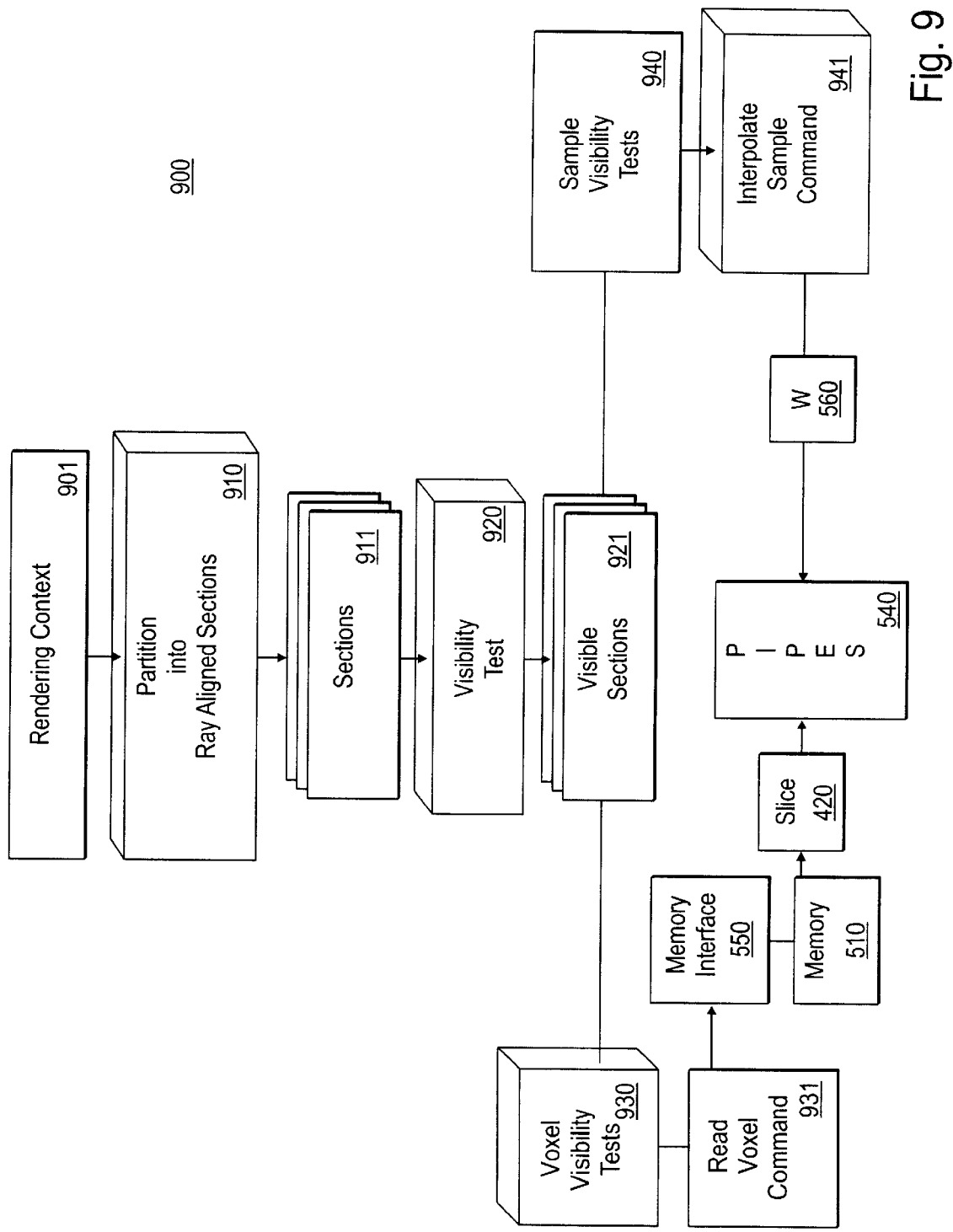

EARLY RAY TERMINATION IN A PARALLEL PIPELINED VOLUME RENDERING SYSTEM

FIELD OF THE INVENTION

This invention relates generally to rendering volume data sets, and more particularly, the invention relates to early termination of rays cast through volume data sets.

BACKGROUND OF THE INVENTION

Volume graphics is the subfield of computer graphics that deals with visualizing objects or models represented as sampled data in three or more dimensions, i.e., a volume data set. These data are called volume elements, or "voxels." The voxels store digital information representing physical characteristics of the objects or models being studied. For example, voxel values for a particular object or model may represent density, type of material, temperature, velocity, or some other property at discrete points in space throughout the interior and in the vicinity of that object or model.

Volume rendering is that part of volume graphics concerned with the projection of the volume data set as two-dimensional images for purposes of printing, display on computer terminals, and other forms of visualization. By assigning color and transparency values to particular voxel data values, different views of the exterior and interior of an object or model can be rendered.

For example, a surgeon needing to examine ligaments, tendons, and bones of a human knee in preparation for surgery can utilize a tomographic scan of the knee and cause voxel data values corresponding to blood, skin, and muscle to appear to be completely transparent. The resulting image then reveals the condition of the ligaments, tendons, bones, etc. which are hidden from view prior to surgery, thereby allowing for better surgical planning, shorter surgical operations, less surgical exploration and faster recoveries. In another example, a mechanic using a tomographic scan of a turbine blade or welded joint in a jet engine can cause voxel data values representing solid metal to appear to be transparent while causing those representing air to be opaque. This allows the viewing of internal flaws in the metal that otherwise is hidden from the human eye.

Real-time volume rendering is the projection and display of the volume data set as a series of images in rapid succession, typically at thirty frames per second or faster. This makes it possible to create the appearance of moving pictures of the object, model, or system of interest. It also enables a human operator to interactively control the parameters of the projection and to manipulate the image, while providing to the user immediate visual feedback. Projecting hundreds of millions of voxel values to an image requires enormous amounts of computing power. Doing so in real time requires substantially more computational power.

Further background on volume rendering is included in a Doctoral Dissertation entitled "Architectures for Real-Time Volume Rendering" submitted by Hanspeter Pfister to the Department of Computer Science at the State University of New York at Stony Brook in December 1996, and in U.S. Pat. No. 5,594,842, "Apparatus and Method for Real-time Volume Visualization." Additional background on volume rendering is presented in a book entitled "Introduction to Volume Rendering" by Barthold Lichtenbelt, Randy Crane, and Shaz Naqvi, published in 1998 by Prentice Hall PTR of Upper Saddle River, N.J.

PRIOR ART VOLUME RENDERING PIPELINES

In one prior art volume rendering system, the rendering pipelines are configured as a single integrated chip, U.S. patent application Ser. No. 09/315,742 "Volume Rendering Integrated Circuit."

In a method called "ray-casting," rays are cast through the volume data set, and sample points are calculated along each ray. Red, green, and blue color values, and an opacity value (also called alpha value) is determined for each sample point by interpolating voxels near the sample points. Collectively, the color and opacity values are called RGBA values. These RGBA values are typically composited along each ray to form a final pixel value, and the pixel values for all of the rays form a two-dimensional image of the three-dimensional object or model.

In some systems based on the ray-casting method, one ray is cast through the volume array for each pixel in the image plane. In other systems, rays are cast according to a different spacing, then the final image is resampled to the pixel resolution of the image plane. In particular, the prior art systems cited above uses the well-known Shear-Warp algorithm of Lecroute et al. as described in "Fast Volume Rendering Using Shear-Warp Factorization of the Viewing Transform," Computer Graphics Proceedings of SIGGRAPH, pp. 451–457, 1994. There, rays are cast from uniformly spaced points on a plane parallel to one of the faces of the volume array. This plane is called the base plane, and the points are aligned with axes of the base plane.

FIG. 1 depicts a typical volume rendering pipeline 100 of the prior art, such as described in U.S. patent application Ser. No. 09/353,679 "Configurable Volume Rendering Pipeline." Voxels are read from a volume memory 110 and passed through a gradient estimation stage 120 in order to estimate gradient vectors. The voxels and gradients are then passed through interpolation stages 130 in order to derive their values at sample points along rays, and through classification stages 140 in order to assign RGBA color and opacity values. The resulting RGBA values and interpolated gradients are then passed to illumination stages 150, where highlights and shadows are added. The values are then clipped and filtered in stages 160 in order to remove portions of the volume or otherwise modulate the image of the volume. Finally, the values are composited in stages 170 to accumulate all of the RGBA values for each ray into final pixel values for writing to a pixel memory 180.

It should be noted that the gradient estimation stages 120, interpolation stages 130, and classification stages 140 can be connected in any order, depending upon the requirements of the application. This architecture is particularly suited to parallel implementation in a single integrated circuit, as described in the above referenced Patent Applications.

As an alternative to compositing a two-dimensional image, RGBA values can be written out as a three-dimensional array, thereby creating a new volume data set, which can be rendered with different transfer functions. In other words, the final images is the result of progressive rendering cycles on an evolving volume data set.

Partition Into Sections

One of the challenges in designing a volume rendering engine as a single semiconductor integrated circuit is to minimize the amount of on-chip memory required to support the functions of the volume rendering pipelines.

As shown in FIG. 2 for the shear-warp algorithm implemented of the prior art, the amount of on-chip memory is directly proportional to an area of a face 210 of a volume data set 200 that is most nearly perpendicular to a view direction 220, that is the xy-face as illustrated in FIG. 2. In the prior art, this memory was reduced by partitioning the volume into sections, and by rendering the volume a section at a time.

FIG. 2 illustrates the partition of the volume into sections 230 in both the x- and y-directions. Each section is defined by an area on the xy-face of the volume array and projects through the entire array in the z-direction. These sections are known as "axis-aligned sections" because they are parallel to the z-axis of the array. This partition reduces the requirement for on-chip memory to an amount proportional to the area of the face of the section in the xy-plane rather than to that of the entire volume. It also makes it possible to design a circuit capable of rendering arbitrarily large volume data sets with a fixed amount of on-chip memory.

One consequence of partitioning the volume data set into axis-aligned sections is that when rays traverse the volume at arbitrary angles, the rays cross from one section to another. For example, a ray 240 parallel to view direction 220 enters into section 231, crosses section 232, and then exits from section 233. Therefore, the volume rendering pipeline must save the partially composited (intermediate) values of rays that have been accumulated while traversing one section in an intermediate storage, so that those composited values are available when processing a subsequent section. Moreover, when a volume rendering system comprises a number of pipelines operating in parallel, the values of the rays must be passed from one pipeline to the next, even within a particular section.

These two requirements cause the need for a considerable amount of circuitry to communicate data among the pipelines and to write and read intermediate ray values. It is desirable to reduce this communication and circuit complexity.

Clipping and Cropping

It is common in volume rendering applications to specify portions of the volume data set that are cut away or clipped, so that interior portions of the object can be viewed, see U.S. patent application Ser. No. 09/190,645. For example, cut planes can be used to slice through the volume array at any oblique angle, showing an angled cross-section of the object. Similarly, combinations of crop planes may be employed to provide distinctive views of an object. Another method of clipping a volume is by an arbitrary clip surface represented by a depth buffer, see U.S. patent application Ser. No. 09/219,059. Depth tests associated with the depth buffer can be used to include or exclude sample points based on their depth values relative to the depth buffer.

In a prior art pipeline, such as represented by FIG. 1, tests for clipping and cropping were implemented in stages 160 just prior to the compositor 170. Depth tests were implemented in the compositor 170 itself. The effect was that every voxel of the volume data set was read into the pipeline 100, and every sample was processed through most, if not all of the volume rendering pipeline, whether or not the sample contributed to the final image of the object or model being rendered. In most cases, this represents unnecessary processing and inefficient use of circuitry. It is desirable to skip over voxels and samples completely if those voxels do not contribute to the final image.

Skipping Non-Visible Voxels and Samples

There are three ways that a sample point may not be visible in the final image. First, the sample may be clipped out of the final image by one of the cut planes, crop planes, or depth tests. Second, the sample may be obscured by other samples which are individually or collectively opaque. Third, the sample may have been assigned a transparent color while the sample is processed.

Skipping over voxels or samples that are explicitly clipped is called "pruning." While this is easy in software implementations of volume rendering, pruning is difficult in hardware implementations. The reason is that prior art hardware systems focus on the systematic movement of data in order to obtain the desired performance from conventional dynamic random access memory (DRAM) modules. By skipping over such data, the orderly progression of data from voxel memory through the volume rendering pipelines is upset, and a complex amount of control information is necessary to keep track of samples and their data.

Skipping samples that are obscured by other parts of the volume is called "early ray termination." Again, this is easy in software implementations, but very difficult in hardware implementations. Skipping some rays and not others also upsets the orderly progression of data flowing from the memory through the pipelines, just as in the case of pruning voxels and samples.

One form of early ray termination is described by Knittel in "TriangleCaster—Extensions to 3D-Texture Units for Accelerated Volume Rendering," Proceedings of Eurographics SIGGRAPH, pp. 25–34, 1999. There, volumes are rendered by passing a series of triangles through a 3D texture map in a front-to-back order. If all of the pixels of a triangle are opaque, then triangles behind that triangle can be skipped. The difficulty with that method is that the method depends on first converting the volume to triangles, rather than rendering the volume directly. Moreover, that method cannot terminate opaque rays on a ray-by-ray basis, only on a triangle-to-triangle basis.

Skipping over transparent parts of the volume is called "space leaping." This is commonly practiced in software volume rendering systems, but space leaping requires that the volume data set is pre-processed each time transfer functions assigning RGBA values change. This preprocessing step is costly in performance, but the result is a net benefit when the transfer functions do not change very often. In prior art hardware systems, space leaping also required a pre-processing step, but at hardware speeds. However, taking advantage of space-leaping upsets the ordered progression of data flowing from the memory through the pipelines, just as pruning voxels and samples and just as early ray termination.

In Knittel's TriangleCaster system, space leaping is accomplished by first encapsulating non-transparent portions of the volume with a convex polyhedral hull formed of triangles. Portions of the volume outside the hull are excluded by using depth tests on the hull. As a problem, that method requires a significant amount of processing on the host system which must be repeated whenever the transfer function changes, possible making that method unsuitable for real-time interactive volume rendering. As another problem, an object with large concavities, such as a turbine with razor thin blades, will mostly consist of transparent portions within the convex hull. It would be desirable to use the rendering engine itself for space leaping.

Therefore, it is desirable to have a hardware volume rendering architecture that operates with real-time performance but does not have to render voxels and samples that are clipped out of the image, that are obscured by other parts of the image, or that are transparent.

SUMMARY OF THE INVENTION

A method renders a volume data set as an image in a volume rendering system. The volume data set includes a plurality of voxels stored in a memory. The volume rendering system includes a plurality of parallel processing pipelines. The image includes a plurality of pixels stored in the memory.

A set of rays are cast through the volume data set. The volume data set is partitioned into a plurality of sections aligned with the sets of rays. Voxels along each ray of each set are sequentially interpolated voxels in only one of the plurality of pipelines to generate samples only as long as the samples contribute to the image.

BRIEF DESCRIPTION OF THE DRAWINGS

FIG. 9 is a flow diagram of a controller for the rendering pipelines of FIG. 5.

DETAILED DESCRIPTION OF THE PREFERRED EMBODIMENT

Ray-aligned Sections

Figure 1:
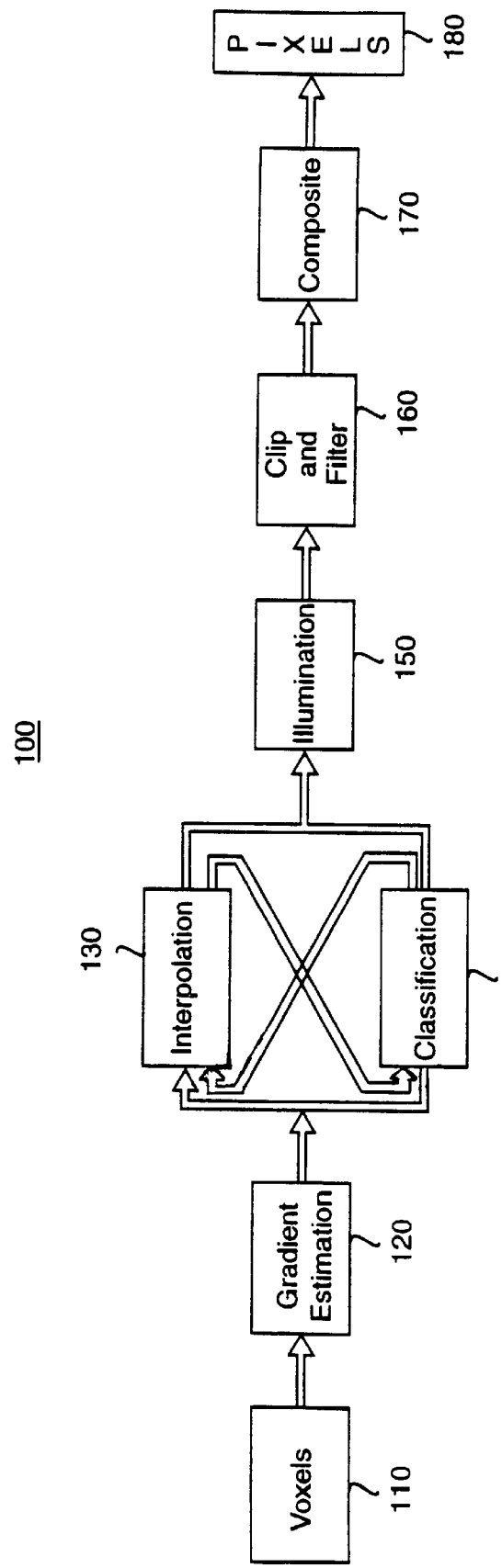
FIG. 1 is a block diagram of a prior art volume rendering pipeline.
Figure 2:
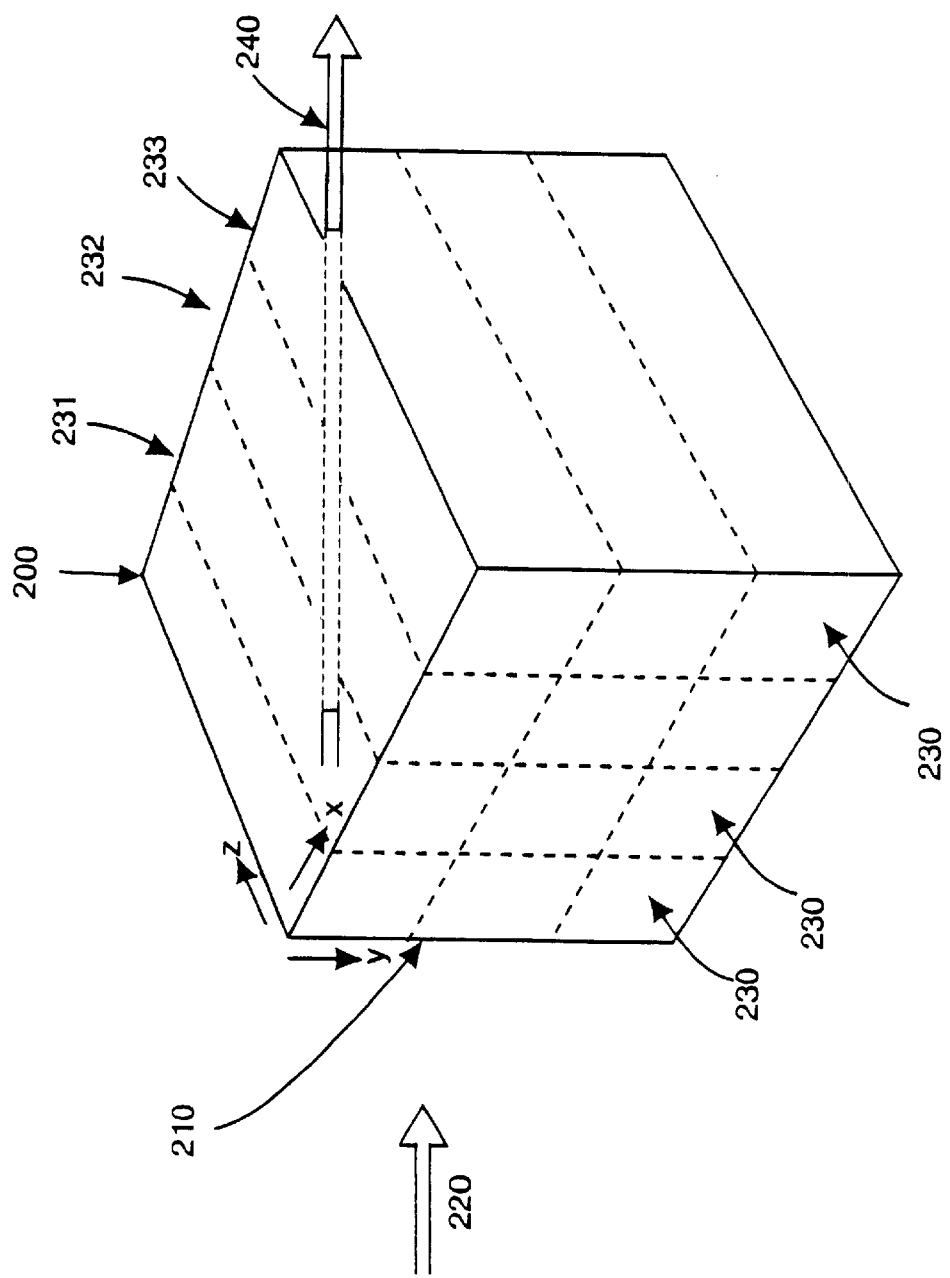
FIG. 2 is a diagram of a volume data set partitioned into axis-aligned sections of the prior art.
Figure 3:
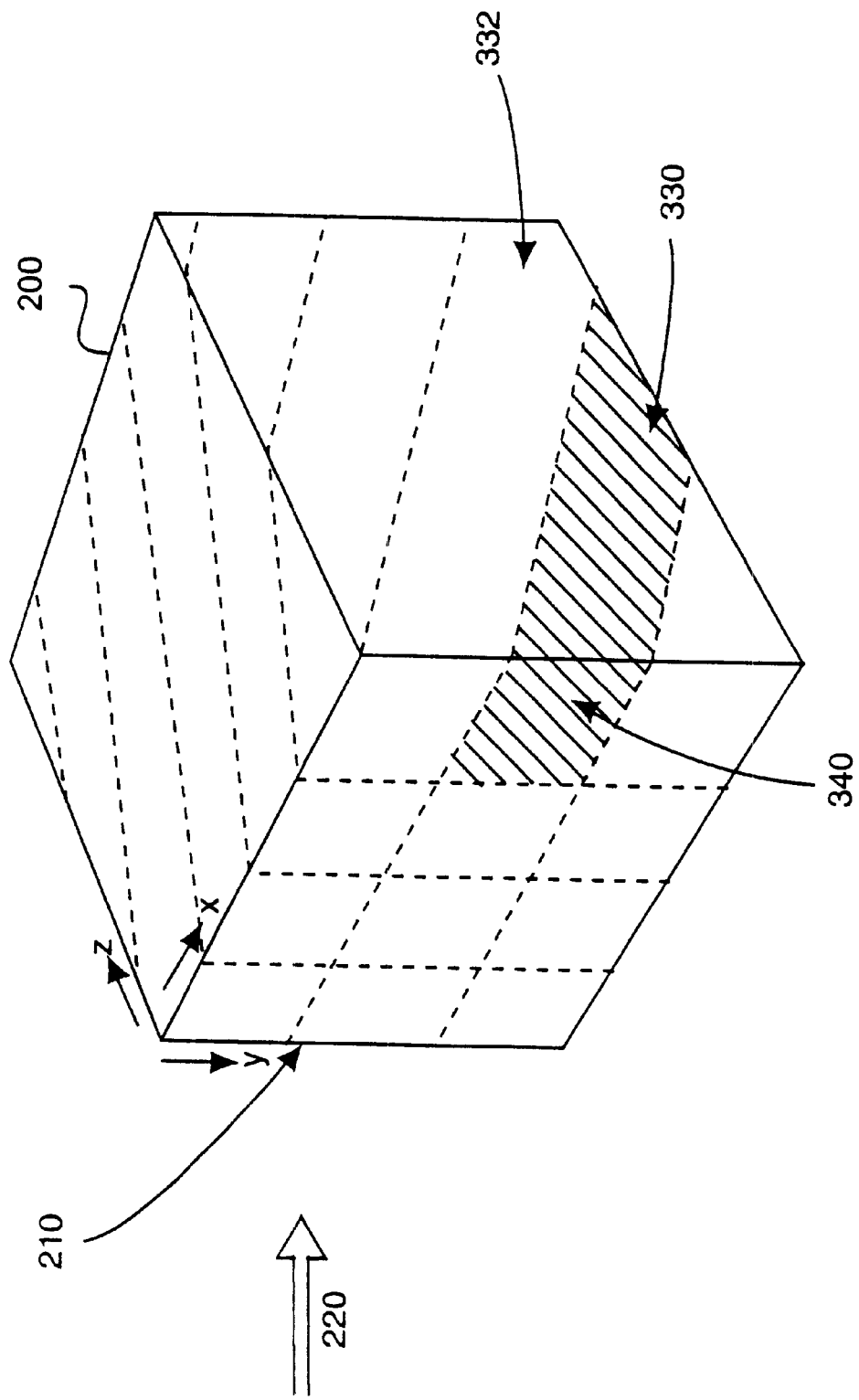
FIG. 3 is a diagram of a volume data set partitioned into ray-aligned sections.

As shown in FIG. 3, the present volume rendering system partitions the volume data set 200 into ray-aligned sections 330–332. Each section is defined by an area 340 on an xy-face 210 of a volume data set 200. The sections project through the volume in a direction parallel to a selected view direction 220 rather than parallel to the z-axis as in the prior art. Each ray-aligned section is defined as a "bundle" or set of rays, rather than a set of voxels as in the prior art.

Each ray-aligned section encompasses all of sample points needed to produce a final RGBA pixel values for each ray of the section's ray set.

In the preferred embodiment, the pattern of the rays defining the bundle is typically a rectangle or parallelogram on the xy-face 210 of the volume data set 200. However, other patterns can also be chosen. For example, section 330 is the subset of rays parallel to the view direction 220 that strike the rectangular area 340 of the face of the volume array, then proceed through the volume in an increasing x- and y-direction.

Figure 4:
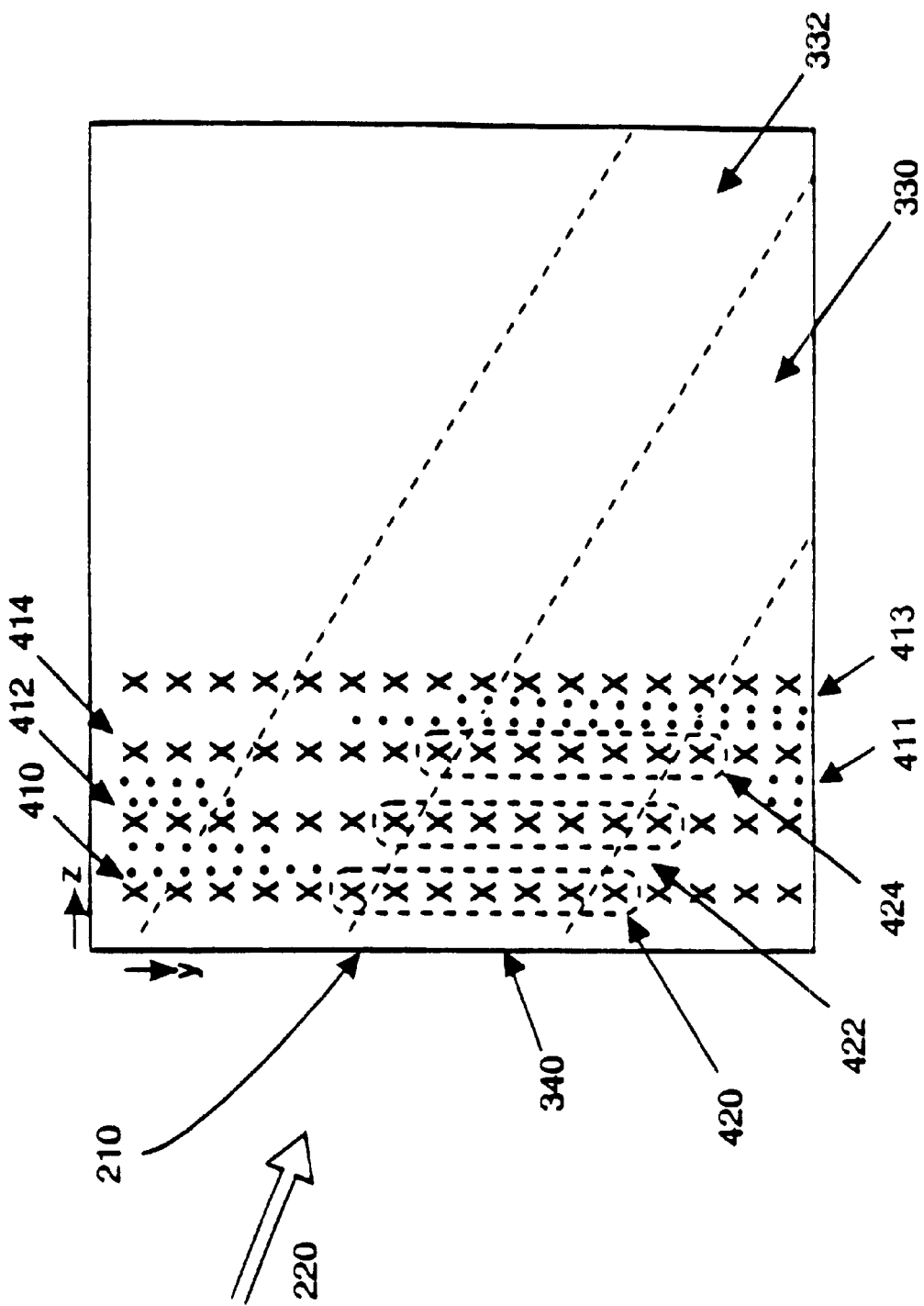
FIG. 4 is a cross-sectional view of a ray-aligned section.

FIG. 4 is a cross-sectional view of the volume data set 200 in the yz-plane with a side view of section 330. Slices are two-dimensional arrays of voxels parallel to the xy-face of the volume array. These are depicted in FIG. 4 as vertical columns of "x" symbols 410, 412, 414, etc. The second dimension of each slice is perpendicular to the page. Planes of samples 411 and 413 are shown by vertical columns of "●" between the voxel slices. The density of the samples can be different than that of the voxels. For example, if the volume data set is supersampled, the density of the samples is greater than that of the voxels. In most instances, the samples will not coincide with the voxels, therefore, the samples are interpolated from nearby voxels using convolution kernels having weights.

In contrast to the prior art, the present rendering system offsets each voxel slice from the previous voxel slice by an amount determined by the angle of the ray for a particular view direction. For example, section slices 420, 422, and 424 are subsets respectively of slices 410, 412, and 414 needed to render section 330. Note that section slice 422 is offset in the y-direction from section slice 420 and that section slice 424 is offset in the y-direction from section slice 422. In general, a section slice may be offset in both the x- and y-directions from its neighbor.

Note that interpolation of sample values and estimation of gradients of samples near the edge of the section depend upon voxels that lie near the edges in adjacent sections. Therefore, near the edges, the voxels of the sections partially overlap. The amount of overlap is determined by the size of the convolution kernel needed for estimating gradients and interpolating the samples from the voxels.

Ray-aligned sections bring a number of advantages. For example, the samples of an entire ray may be assigned to a particular volume rendering pipeline, as described below. As a result, no intermediate values need to be passed among adjacent pipelines. Because each ray is contained entirely within one section, no intermediate values of rays need be communicated from one section to another via on-chip or off-chip memory. Both of these result in considerable reductions in the amount of circuitry needed in the volume rendering pipelines.

Other advantages of ray-aligned sections include the ability of the pipeline to efficiently compare sample positions to depth buffers produced by a traditional graphics engine. This in turn enables both arbitrary volume clipping and embedding polygon graphics into the rendered volume. Ray-aligned sections also allow a variety of optimizations, such as space leaping and early ray termination described in greater detail below.

PIPELINED PROCESSING OF VOWELS AND SAMPLES

Rendering Engine Structure

Figure 5:
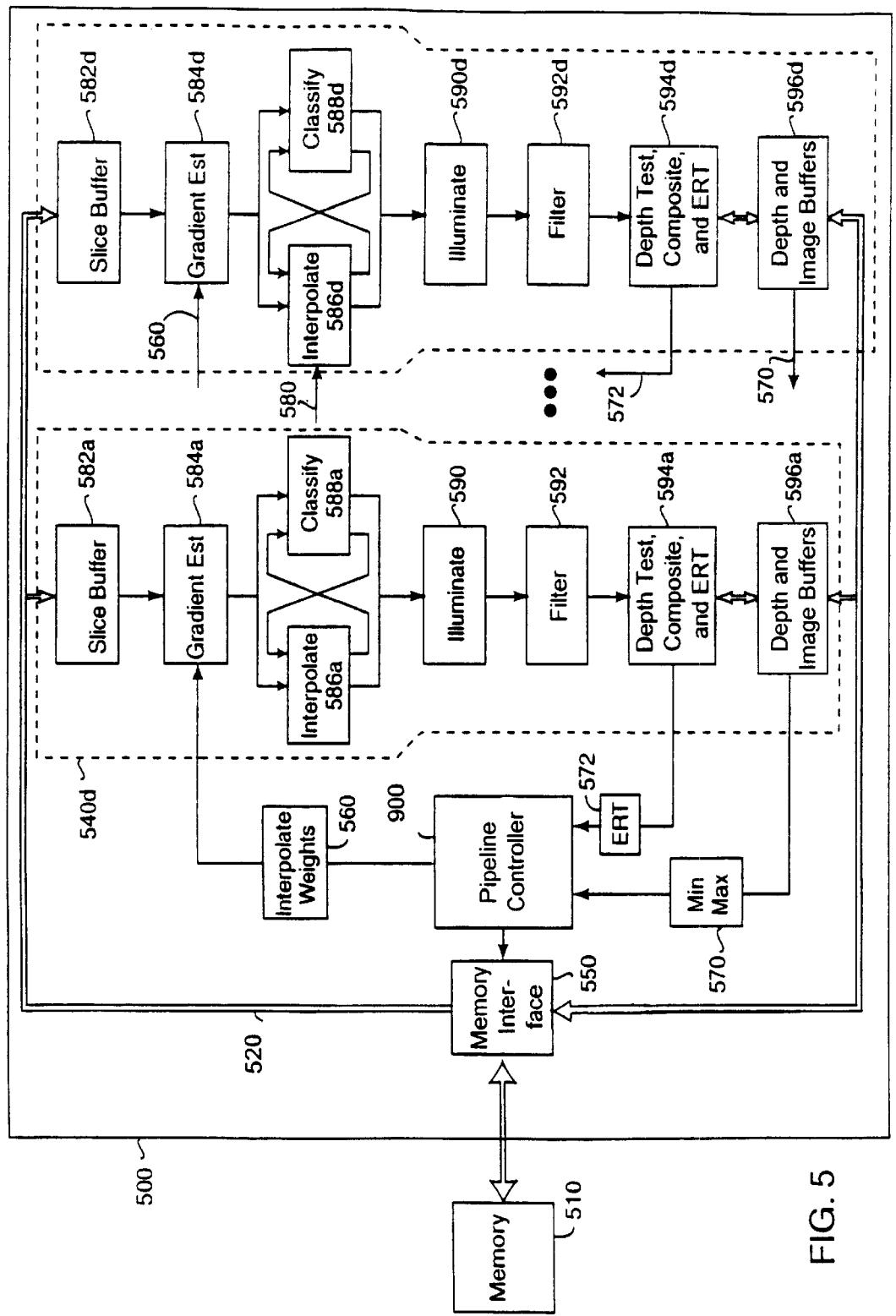
FIG. 5 is a block diagram of volume rendering pipelines according to the invention.

FIG. 5 is a block diagram of an integrated circuit 500 and associated memory modules 510 for rendering a volume data set partitioned into ray-aligned sections according to the present rendering system.

The integrated circuit 500 includes a memory interface 520, a pipeline controller 900, and a plurality of volume rendering pipelines 540a, . . . , 540d.

Not shown in FIG. 5, but necessary in a practical system, is a bus interface for communication with a host computer. A user interacts with the host while rendering the volume data set stored in the memory 510.

The integrated circuit 500 acts as a special purpose SIMD (Single-Instruction, Multiple Data) parallel processor, with the controller 900 providing control logic and the volume rendering pipelines 540a, . . . , 540d comprising the execution engines operating in response to controller commands. Each of the pipelines also includes numerous registers and buffers for storing data and control information during operation.

Each pipeline 540a–d includes a slice buffer 582 at a first stage of the pipeline, a gradient estimation unit 584, interpolation stages 586, classification stages 588, illumination stages 590, filter stages 592, depth test, composite and early ray termination (ERT) stages 594, and depth and image buffers 596 at a last stage of the pipeline.

Rendering Engine Operation

During operation of the pipelines, the controller 900 performs a number of functions. The controller partitions the volume according to the ray-aligned sections of FIG. 3, and processes data associated with the ray-aligned sections in a predetermined order. The controller issues memory access commands to the memory interface 550. The commands transfer data between the memory 510 and the pipelines 540a–d. For example, the controller issues read commands to the interface to distribute slices of voxels from the memory 510 to the slice buffers. The controller initializes the depth buffers 596, and the controller writes pixel values back to the memory 510.

The controller also generates the weights 560 used by the convolution kernels. The convolution kernels are used during gradient estimation and interpolation. At the completion of each section, the controller issues commands to write images to the memory, and to updated depth buffers as necessary.

For each section, depth and image buffers are both read and written in order to allow embedding of polygon objects within images of volume objects. While reading depth buffers for a section, minimum and maximum (Min, Max) values 570 are obtained for use by controller 900 in voxel pruning described below.

The controller 900 assigns the rays of a section equally among the plurality of pipelines 540a, . . . , 540d. When the controller initializes the depth and image buffers in preparation a section to be processed, the controller partitions section's data among the depth and image buffers 596a, . . . , 596d according to the partitioning of the rays. For example, in the preferred embodiment, there are four volume rendering pipelines in integrated circuit 500, so that each depth and image buffer 596a, . . . , 596d holds one fourth of the total depth and image values for the section.

When the controller 900 causes voxels of a slice to be fetched, the controller directs them to the slice buffers 582a, . . . , 582d so that each pipeline has the necessary voxels to render its rays. In this case, a voxel will typically be directed to more than one slice buffer because a particular voxel may be needed for interpolating samples of multiple rays.

In each clock cycle, a particular pipeline takes voxels needed for gradient estimation and interpolation of one sample point from its slice buffer 582. This sample point then passes down the pipeline, one stage per cycle, until it is composited into the image buffer 596 at the last stage of the pipeline.

In pipeline fashion, the controller 900 causes a stream of voxels from all the section slices of a section to be directed to the slice buffers 582a, . . . , 582d, fast enough for the pipelines 540a, . . . , 540d to process the voxels and composite samples into the image buffer 596.

Even though each section slice is offset from its neighboring slice, the controller aligns the section slices so that sample points for each ray are always processed by the same pipeline. Therefore, unlike the prior art, communication among adjacent pipelines is avoided. This results in a considerable simplification of the integrated circuit 500.

The relative position of the slice buffers 582 and the gradient estimation stage 584 may be interchanged in order to reduce the amount of redundant on-chip memory devoted to the slice buffers. For example, gradients can be estimated before the voxels are stored in the slice buffers.

Supersampling in the x- and y-directions becomes trivial with ray-aligned sections because the controller 900 focuses on rays, not voxels. If rays are spaced closer than voxels in either the x- or the - or the y-direction to achieve supersampling, then appropriate voxels can be directed redundantly to the pipelines responsible for the respective rays. In contrast, voxels in prior art pipelines were associated with pipelines, not rays, and therefore considerable communication among pipelines and other complexity were required for supersampling, see for example, U.S. patent application Ser. No. 09/190,712

Voxel and Sample Pruning

In the present pipelined volume rendering system, one goal is to minimize the number of voxels and samples that need to be processed, thereby improving performance. Therefore, numerous steps are taken to identify these data. Furthermore, another goal is to identify such data as early as possible. The identification of "visible" and "invisible" data is done both by the controller and the various stages of the pipelines.

For example, as the controller enumerates sections, cut plane equations are tested, and cropping boundaries are checked to determine whether particular samples of a section are included or excluded from the view. If the samples are excluded from the view, then the processing of the section can be terminated without reading voxels and without sending samples down the volume rendering pipelines. Furthermore, the controller "looks-ahead" to anticipate whether later processed data can cause current data to become invisible, in which case processing of current data can be skipped altogether.

Likewise, the controller performs coarse grain depth tests for each section. The controller does this by determining the minimum and maximum values 570 of each depth array as the array is fetched from memory into the image and depth buffers 596a, . . . , 596d. These minimum and maximum values 570 are communicated to the controller 900 from the depth and image buffers 596. If the controller can determine that all of the depth tests of all of the samples within a section fail, then processing of that section can be terminated without reading voxels and without sending samples down the pipelines.

The controller repeats these tests at a finer grain as described below. For example, if the controller can be determined that all of the samples of a particular slice or group of slices fail a clip, crop, or depth test, then those slices are skipped.

Because sections in the present pipelined volume rendering system are ray aligned, the skipping of samples, slices, or whole sections presents no problem for the pipelines 540a, . . . , 540d. Each pipeline processes an independent set of rays and each sample point passes down the pipeline independent of samples in other pipelines. It is only necessary to include "visibility" control information for each sample as the sample flows down the pipeline, so that the sample is composited with the correct element of the final image buffer. If sections were aligned with the z-axis of the volume, then this control information would entail great complexity.

Therefore, each sample has an associated "visibility" bit. As long as the visibility bit is set, the sample is valid for processing. When it is determined that the sample will not contribute to the final image, that is the bit is unset, and the sample becomes invalid for further processing.

Note that for samples that are passed down the pipelines, a final depth test must still be performed because the depth buffer value associated with that ray may lie somewhere between the minimum and maximum of the section. This final depth test is performed during compositing, in stage 594a, . . . , 594d.

Early Ray Termination

Early ray termination is an optimization that recognizes when further samples along a ray cannot affect the final composited result. For example, during front-to-back processing, when a fully opaque surface is encountered, no samples behind the surface will be visible, and hence these samples need not be processed. Similarly, when rays pass through thick translucent material such as fog, they may eventually accumulate so much opacity that no samples further along the ray can be seen. In another example, the depth values of a ray may cross a threshold so that no further samples along that ray pass depth tests.

In these cases, the compositor 594 may determine that processing of the ray can be terminated. In this case, the compositer signals the controller to stop processing that ray via an ERT (Early Ray Termination) signals 572. When the controller receives such the ERT signal for a ray, it skips over subsequent voxels and samples involving that ray. The controller also keeps track of the ERT signals for all of the rays of a section, so that when all rays in a particular section are terminated, processing for the entire section is terminated.

In a typical implementation, the controller maintains a bit mask. The mask has one bit for each ray of the section. When all of the bits of the mask indicate termination, then the section is terminated.

Note that in most cases, when the compositor has determined that a ray should be terminated, there may still be samples for that ray in previous stages of the volume rendering pipeline. Therefore, in order to preserve the semantics of early ray termination, the compositor ignores and discards all subsequent samples along that ray after the compositor has determined that a ray has terminated according to any criterion. Thus, there will be a delay between the time of early termination of one ray and the last sample of that ray to complete its course through the pipeline.

In the preferred embodiment, the threshold of opacity for early ray termination is implemented in a register that can be set by an application program. Therefore, any level of opacity may be used to terminate rays, even if the human eye were capable of detecting objects behind the terminated sample.

Space Leaping

Figure 6:
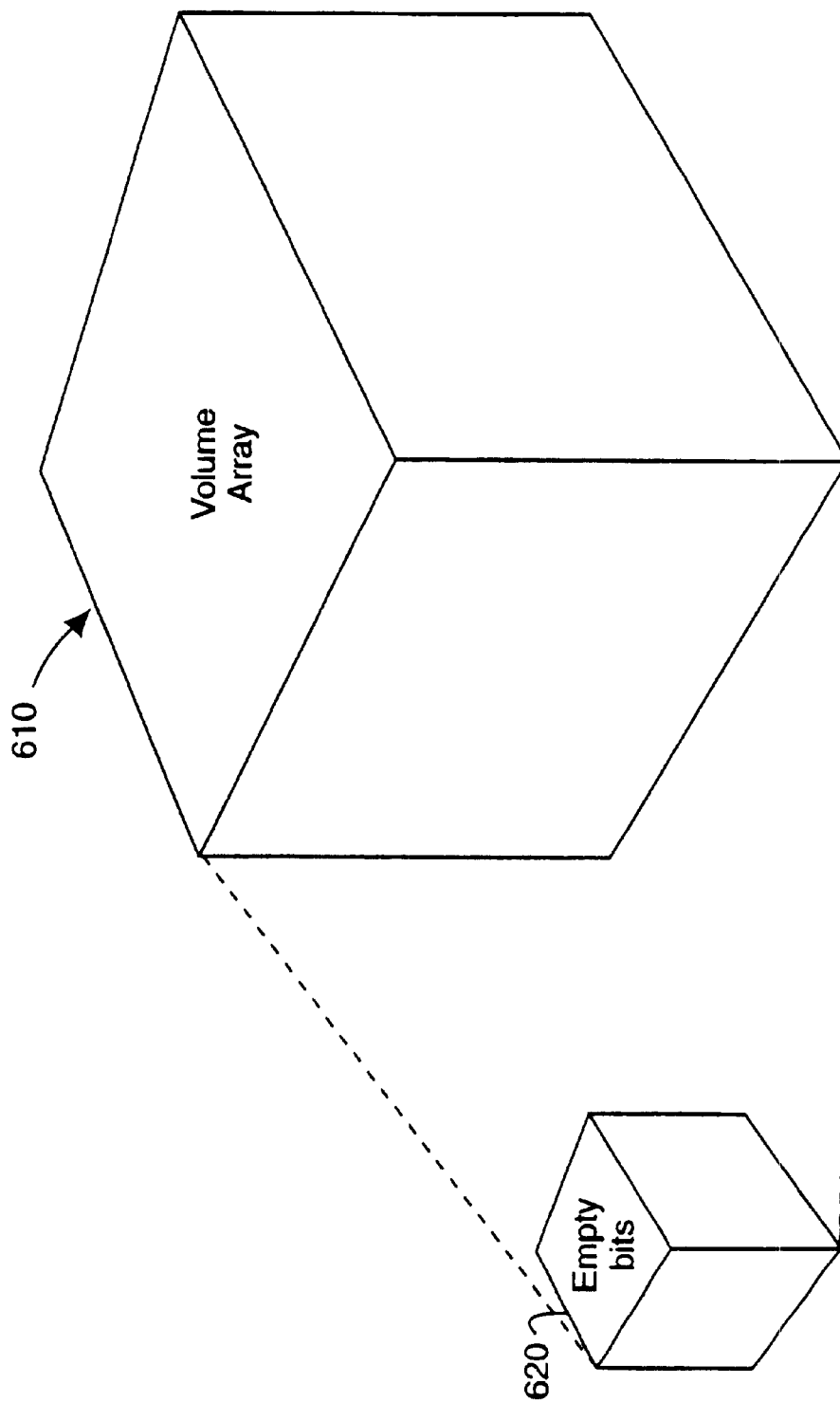
FIG. 6 is a diagram of a three-dimensional array of empty bits corresponding to the volume data set.
Figure 7:
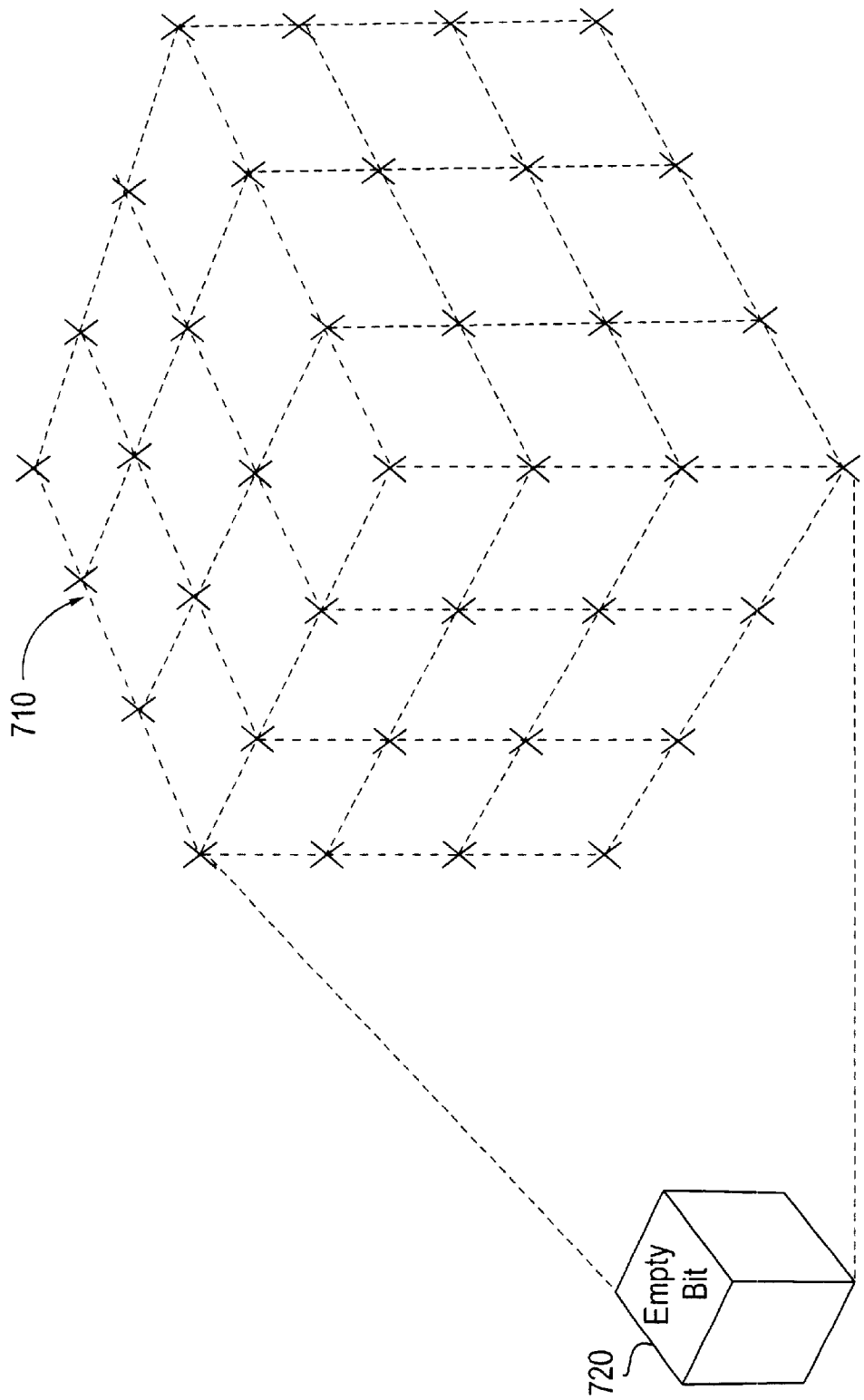
FIG. 7 is a block diagram of one empty bit for a block of the volume data set.

Space leaping allows the pipelines to skip over transparent portions of the volume. For example, many volume models include one or more portions of transparent "empty" space around the object or model of interest. Also, classification and lighting functions may make certain types of tissue or material transparent. Similarly, filtering functions based on modulation of gradient magnitudes can cause portions of the volume to become transparent. By skipping these transparent portions, the number of invisible samples is reduced, thereby reducing the time needed to render the entire volume. As shown in FIGS. 6 and 7, the present pipelined volume rendering system implements space leaping by maintaining an array of bits 620 called "empty bits" corresponding to the volume array 610. For the three dimensional volume array 610, there is a corresponding three dimensional array of empty bits 620. Typically, one bit 720 in the array of empty bits corresponds to a block of voxels 710. If the empty bit 720 is set, then the voxels of the corresponding block 710 will not contribute to the visibility of samples passing near them. That is, the volume at each of the voxels in the block is transparent. As shown in FIG. 7, each empty bit 720 can correspond to a cubic block of, for example, 4×4×4 voxels, or 64 voxels in total. The 4×4×4 cubic array of voxels 710 is represented by the single empty bit 720. Therefore, the empty bit array has $1/64^{th}$ the number of bits as there are voxels. Because voxels may be 8, 16, 32, or more bits, the empty bit array requires $1/512^{th}$, $1/1024^{th}$, $1/2048^{th}$, or a smaller fraction of the storage of the volume array itself.

The semantics of empty bits are as follows. If all of the voxels needed to interpolate a sample point are indicated as transparent by their empty bits, then the sample point itself is deemed to be invisible and not contributing to the final image. Therefore, the controller 900 can omit the reading of those voxels, and can avoid sending the sample points down the volume rendering pipeline.

If, as is typical in many volume data sets, a large portion of a volume is transparent as indicated by their empty bits, then the controller can omit reading those voxels and processing those samples. By simply ANDing together the empty bits of a region, the controller can efficiently skip the region.

In the preferred embodiment, the array of empty bits 620 is generated by the pipelines themselves, operating in a special mode, in other words, there is no lengthy preprocessing by the host. In this mode, the view direction is aligned with one of the major axes of the volume, and the sample points are set to be exactly aligned with voxel positions, hence interpolation becomes trivial.

Then, the volume is rendered once with desired transfer functions to assign color and opacity and with desired filters based on gradient magnitude and other factors. The compositing stages 594a, . . . , 594d examine each RGBA sample to determine whether the opacity of the sample is less than a predetermined threshold. If true, then the sample and its corresponding voxel are deemed to be transparent. If all of the voxels in a 4×4×4 region are transparent, then the corresponding empty bit is set to true. If, however, any voxel in the region is not transparent, then the corresponding empty bit is set to false.

During normal rendering of a volume data set, the controller 900 reads a array of empty bits for the parts of the volume through which a particular section passes. If all of the bits indicate that the portion of the volume is transparent, then the slices of voxels in that portion of the volume are not read and the samples based on these slices are not processed.

Figure 8:
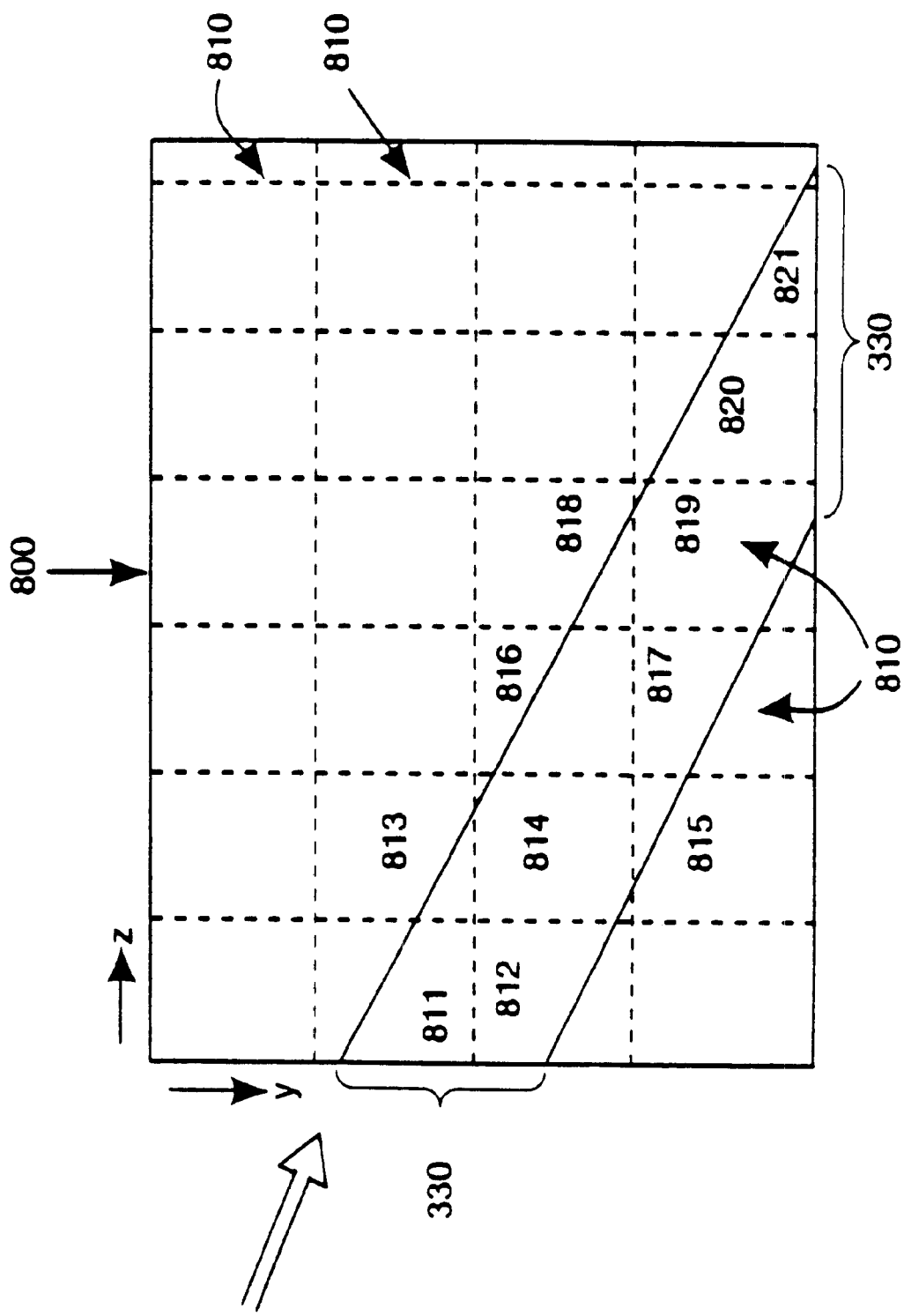
FIG. 8 is a cross-section of the volume data set.

This is illustrated in FIG. 8. For the purpose of the empty bits, the volume data set 200 is partitioned into 32×32×32 blocks of voxels 810 aligned with the major axes of the volume. Each block is represented by a 64-byte block of empty bits as described above. Section 330 passes through the volume array at an angle represented by view direction 220. The section intersects with blocks 811–821. As part of processing the section 330, the controller fetches the corresponding blocks of empty bits, ANDs the bits together and determines whether or not the corresponding blocks of voxels and samples can be skipped. Because sections are aligned with rays, transparent samples may be skipped without adding extra complexity to the circuitry of the present pipeline.

Naturally, if classification lookup tables assigning color and opacity change, or if filter functions affecting modulation of opacity change, then the empty bit array 620 becomes invalid, and must be recomputed. However, this does not require host processor resources.

Pipeline Controller

As illustrated by FIG. 9, the controller 900 of the present pipelined rendering system operates as follows.

The controller is provided with a complete rendering context 901. The rendering context includes all control information needed to render the volume, for example, the view direction, the size of the volume, equations defining cut and crop planes, bounding boxes, scaling factors, depth planes, etc.

The controller uses the context to partition 910 the rays of the volume data set according to ray aligned sections 911. The sections 911 are enumerated for processing according to a predetermined order. Each section can be expressed in terms of its geometry with respect to its rays cast through the volume, and with respect to voxels needed to produce samples along the rays.

For each section 911, step 920 performs visibility test 920 as described above. Sections that are outside the field of view ("invisible") are skipped, and only "visible" sections 921 are further processed.

Step 930 processes each visible section 921 from the perspective of voxels, and in parallel, step 940 processes the section from the perspective of samples.

Step 930 steps along rays in slice order. For each slice, or group of slices, with look-ahead wherever possible, voxel visibility tests are performed as described above. If a particular slice has at least one visible voxel, then the controller issues a read slice command 931 to the memory interface 550, and a slice of voxels 420 is transferred from the memory 610 to one of the slice buffers 582 of the pipelines 540. If the slice fails the visibility test, then it is skipped. Concurrently, step 940 performs sample visibility tests. Note, that voxels and samples are arranged according different coordinate systems, therefore samples might fail this test, even though corresponding voxels passed, and vice versa. If the sample passes, then an interpolate sample command 941 is issued, along with interpolation weights (w) 560, and processing commences. Subsequently, the various stages of the pipeline perform further visibility tests, such early ray termination, and depth testing, and processing of a particular sample can be aborted.

It will be appreciated that additional optimizations for further improvements in volume rendering performance. For example, in certain embodiments, sample slices are partitioned into quadrants, with each quadrant being tested independently for visibility according to the cut plane, cropping, and depth tests.

We claim:

1. A method for rendering a volume data set as an image in a volume rendering system, wherein the volume data set includes a plurality of voxels stored in a memory, the volume rendering system includes a plurality of parallel processing pipelines, and the image includes a plurality of pixels stored in the memory; comprising the steps of:
    casting sets of rays through the volume data set;
    partitioning the volume data set into a plurality of sections aligned with the sets of rays; and
    sequentially interpolating voxels along each ray and that are within the section aligned with the set of rays including that ray, in only one of the plurality of pipelines to generate a sample and only if the sample contributes to the image.

2. The method of claim 1, further comprising the step of:
    terminating the sequential interpolating when an opacity value of the sample exceeds a predetermined threshold.

3. The method of claim 2, further comprising the steps of:
    associating a termination bit with each ray of the set;
    setting the termination bit when the opacity value of the sample exceeds the predetermined threshold; and
    terminating the sequential interpolating for the set of rays when each termination bit associated with the set of rays is set.

4. The method of claim 2, wherein a mask for each section includes a bit for each of the rays within the set of rays with which the section is aligned, and further comprising the steps of:
    setting a bit in the mask based on the terminating of the sequential interpolating of voxels along the ray; and
    terminating the sequential interpolating of voxels along all rays within the set of rays with which the section is aligned if all bits in the mask are set.

5. A method for rendering a volume data set as an image, wherein the volume data set includes a plurality of voxels and the image includes a plurality of pixels, comprising:
    casting a set of rays through the volume data set;
    partitioning the volume data set into a plurality of sections, one section being aligned with the set of rays; and
    sequentially interpolating voxels along each ray of the set in only one of a plurality of processing pipelines to generate only samples that contribute to the image.

6. The method of claim 5, further comprising:
    terminating the sequential interpolating when an opacity value of the generated samples exceeds a predetermined threshold.

7. The method of claim 6, further comprising:
    associating a termination bit with each ray of the set;
    setting the termination bit when the opacity value exceeds the predetermined threshold; and
    terminating the sequential interpolating for the set of rays when each termination bit associated with the set of rays is set.

8. The method of claim 6, wherein a mask for each section includes a bit for each ray of the set, and further comprising:
    setting a bit in the mask when terminating the sequential interpolating of voxels along a ray; and
    terminating interpolation for all rays of a particular section when all bits in the mask are set.

9. A volume rendering system comprising:
    a plurality of parallel processing pipelines; and
    a memory coupled to the plurality of parallel processing pipelines, the memory storing a volume data set, wherein the plurality of the processing pipelines and the memory are operable to perform a method for rendering the volume data set as an image, the method comprising:
        casting sets of rays through the volume data set;
        partitioning the volume data set into a plurality of sections aligned with the sets of rays; and
        generating samples along each ray within at least one of the sets of rays by sequentially interpolating voxels that are adjacent to the ray and that are within a section aligned with the set of rays that includes the ray, wherein the sequential interpolating is performed for each ray in only one of the plurality of pipelines, and wherein each sample is generated only if it is determined that the sample would contribute to the image.

10. A method for rendering a volume data set as an image in a volume rendering system, the method comprising:
    casting sets of rays through the volume data set stored in a memory;
    partioning the volume data set into a plurality of sections aligned with the sets of rays such that each ray within a set from the sets of rays located within a single section;

determining whether samples for each of the plurality of sections would contribute to the image, before loading voxels required to generate the samples for processing within volume rendering pipelines of the volume rendering system; and loading the voxels required to generate the samples for processing by the volume rendering pipelines, only if the samples would contribute to the image.

11. The method of claim 10, wherein determining whether the samples are to be included in the image comprises checking cut plane equations to determine whether a sample is included in the image.

12. The method of claim 10, wherein determining whether the samples are to be included in the image comprises checking cropping boundaries to determine whether a sample is included in the image.

13. A volume rendering system comprising:
a plurality of parallel processing pipelines; and
a memory coupled to the plurality of parallel processing pipelines, the memory storing a volume data set, wherein the plurality of the processing pipelines and the memory are operable to perform a method for rendering the volume data set as an image, the method comprising:

casting sets of rays through the volume data set stored in a memory;

partitioning the volume data set into a plurality of sections aligned with the sets of rays such that each ray within a set of rays from the sets of rays is located within a single section;

determining whether samples for each of the plurality of sections would contribute to the image, loading the samples for processing by the volume rendering pipelines only if it is determined that the samples would contribute to the image.

14. The system of claim 13, wherein determining whether the samples are to be included in the image comprises checking cut plane equations to determine whether a sample is included in the image.

15. The system of claim 13, wherein determining whether the samples are to be included in the image comprises checking cropping boundaries to determine whether a sample is included in the image.

* * * * *